US012729263B2

(12) United States Patent
Flaherty et al.

(10) Patent No.: US 12,729,263 B2
(45) Date of Patent: Sep. 8, 2026

(54) CONDUCTIVE POLYASPARTIC ESTER BASED COMPOSITIONS

(71) Applicant: Parker-Hannifin Corporation, Cleveland, OH (US)

(72) Inventors: Brian Flaherty, Chelmsford, MA (US); Jeremy Gershonowitz, Cambridge, MA (US); George Spies, Wakefield, MA (US)

(73) Assignee: Parker-Hannifin Corporation, Cleveland, OH (US)

( * ) Notice: Subject to any disclaimer, the term of this patent is extended or adjusted under 35 U.S.C. 154(b) by 584 days.

(21) Appl. No.: 18/254,622

(22) PCT Filed: Nov. 15, 2021

(86) PCT No.: PCT/US2021/059379
§ 371 (c)(1),
(2) Date: May 26, 2023

(87) PCT Pub. No.: WO2022/125273
PCT Pub. Date: Jun. 16, 2022

(65) Prior Publication Data

US 2024/0002579 A1 Jan. 4, 2024

Related U.S. Application Data

(60) Provisional application No. 63/122,037, filed on Dec. 7, 2020.

(51) Int. Cl.

| | |
|---|---|
| ***C08G 18/38*** | (2006.01) |
| ***C08G 18/08*** | (2006.01) |
| ***C08L 75/02*** | (2006.01) |
| ***C09D 7/61*** | (2018.01) |
| ***C09D 175/02*** | (2006.01) |

(52) U.S. Cl.
CPC ..... *C08G 18/3821* (2013.01); *C08G 18/0852* (2013.01); *C08L 75/02* (2013.01); *C09D 7/61* (2018.01); *C09D 175/02* (2013.01); *C08G 2150/00* (2013.01); *C08G 2170/00* (2013.01); *C08G 2190/00* (2013.01); *C08L 2205/02* (2013.01)

(58) Field of Classification Search
None
See application file for complete search history.

(56) References Cited

U.S. PATENT DOCUMENTS

| | | | | |
|---|---|---|---|---|
| 9,944,821 B2 | 4/2018 | Squiller et al. | | |
| 10,781,339 B2 | 9/2020 | Wade | | |
| 2003/0118739 A1* | 6/2003 | Li | B05D 5/00 | 427/388.1 |
| 2007/0048445 A1* | 3/2007 | DiMario | B62D 29/043 | 427/372.2 |

FOREIGN PATENT DOCUMENTS

| | | |
|---|---|---|
| CN | 104497825 A | 4/2015 |
| CN | 104530944 A | 4/2015 |
| CN | 109575777 A | 4/2019 |
| CN | 110564275 A | 12/2019 |
| CN | 110760253 A | 2/2020 |
| DE | 102011003619 A1 | 8/2012 |
| EP | 1461372 B1 | 7/2008 |
| EP | 3502155 A1 | 6/2019 |
| WO | 2020167642 A | 8/2020 |

OTHER PUBLICATIONS

International Search Report and Written Opinion corresponding to PCT/US2021/059379 mailed Feb. 22, 2022.
"CHO-BOND 1030 One Component Flexible Electrically Conductive Silicone Adhesive", Parker Chomerics, TB 1133 EN, Jan. 2014, 2 pages.
"CHO-BOND 1035 One Component Electrically Conductive Silicone Sealant", Parker Chomerics, TB 1139 EN, Jan. 2014, 2 pages.
"CHO-BOND 1075 One Component Corrosion Resistant Electrically Conductive Silicon Sealant", Parker Chomerics, TB 1131 EN, Jan. 2014, 2 pages.
"CHO-BOND 2165 Two Component Corrosion Resistant Electrically Conductive Polyurethane Sealant", Parker Chomerics, TB 1002 EN, Feb. 2016, 2 pages.
International Preliminary Report on Patentability corresponding to PCT/US2021/059379 mailed Feb. 17, 2023.
Written Opinion of the International Preliminary Examining Authority corresponding to PCT/US2021/059379 mailed Nov. 15, 2022.

* cited by examiner

*Primary Examiner* — Tae H Yoon
(74) *Attorney, Agent, or Firm* — Renner, Otto, Boisselle & Sklar, LLP

(57) ABSTRACT

A conductive composition for conductive coatings, gap fillers, caulks and fairing compounds that are useful for EMI shielding, electrical grounding, lightning strike protection, and reduced radar cross-section for low observability (LO), with improved resistance to exposure to water, oil and other fluids contains at least one aspartic ester, at least one isocyanate and a conductive filler.

11 Claims, No Drawings

CONDUCTIVE POLYASPARTIC ESTER BASED COMPOSITIONS

This application is a national phase of International Application No. PCT/US2021/059379 filed Nov. 15, 2021, which claims the benefit of U.S. Provisional Application No. 63/122,037 filed Dec. 7, 2020, the disclosure of which is hereby incorporated herein by reference in its entirety.

FIELD OF INVENTION

The present invention relates broadly to a new class of electrically conductive compositions which may be used as conductive coatings, gap fillers, caulks and fairing compounds that are useful for EMI shielding, electrical grounding, lightning strike protection, and reduced radar cross-section for low observability (LO), with improved resistance to exposure to water, oil and other fluids.

BACKGROUND

The operation of electronic devices such as televisions, radios, computers, medical instruments, business machines, communications equipment, and the like may cause the generation of electromagnetic radiation within the electronic circuitry of the equipment. Such radiation often develops as a field or as transients within the radio frequency band of the electromagnetic spectrum, i.e., between about 10 KHz and 10 GHz, and is termed "electromagnetic interference" or "EMI" and which is known to interfere with the operation of other proximate electronic devices.

To attenuate EMI effects, shielding having the capability of absorbing and/or reflecting EMI energy may be employed both to confine the EMI energy within a source device, and to insulate that device or other "target" devices from other source devices. Such shielding is provided as a barrier that is interposed between the source and the other devices, and typically is configured as an electrically conductive and grounded housing enclosing the device.

The electrically conductive compositions described herein are useful in all manner of electrical housings, enclosures, and in particular, outdoor and aircraft applications where exposure to aggressive fluids, including water, is prevalent. Electromagnetic radiation absorbent/shielding materials and structures are well-known. As those skilled in the art will appreciate, the construction of devices and structures utilizing such electromagnetic radiation absorbent/shielding materials may substantially reduce unwanted or stray electromagnetic radiation by absorbing/reflecting the electromagnetic radiation emitted by the device or incident upon the structure. In this respect, contemporary electromagnetic radiation absorbent/shielding materials function by absorbing/reflecting the electromagnetic radiation according to well-known principles.

Although various materials have been found to be suitable for use in such electromagnetic absorbent/shielding structures, a problem that frequently arises concerns the treatment of gaps that are often formed by intermediate adjacent structural members, such as structural panels or coverings. In this regard, it is recognized that such gaps may contribute substantially to the undesirable reflection of electromagnetic radiation.

Thus, to reduce the reflected by a gap, it is necessary to fill the gap with an electromagnetic radiation reflective material. To that end, namely, to mitigate electromagnetic radiation reflection from such gaps between adjacent electromagnetic radiation panels and the like, conventional methodology requires the use of a conductive filler, designed to produce a material with maximum DC conductivity.

While such contemporary conductive gap fillers have often proven generally suitable for their intended use, the same nonetheless possess inherent deficiencies which tend to detract from their overall desirability. Such inherent deficiencies particularly detract from the usefulness of such gap fillers in outdoor and harsh environments, as well as on low-observable (LO) aircraft. Specifically, the resistance of gap fillers to environmental and aircraft fluids has been less than desired.

In addition, it is advantageous for such conductive compositions to be flexible and at the same time be corrosion-, weather- and fluid-resistant.

SUMMARY

The present invention provides a two-component conductive composition. The conductive composition includes a first component that includes at least one aspartic ester and conductive filler, and a second component includes at least one isocyanate.

The conductive composition may further include an organic solvent. In one embodiment, the conductive composition further includes a catalyst.

Conductive fillers that are suitable for the conductive composition include, for example, nickel, cobalt, silver, gold, silver plated aluminum, nickel plated aluminum, silver plated copper, tungsten clad graphite, nickel clad graphite, and graphite. The at least one aspartic ester of the conductive composition may have the formula (I):

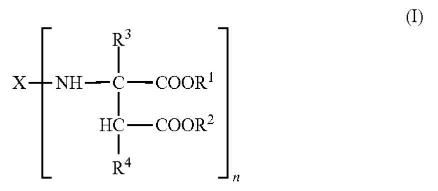

(I)

wherein X represents an aliphatic residue;

$R^1$ and $R^2$ independently represent $C_1$ to $C_{10}$ alkyl residues; and $R^3$ and $R^4$ independently represent hydrogen or an organic group that is inert towards isocyanate at temperatures of 100° C. or less.

In one embodiment, the conductive composition includes a blend of at least two aspartic esters having the formula (I).

In one embodiment, the at least one isocyanate of the conductive composition is selected from among ethylene diisocyanate; 1,4-tetramethylene diisocyanate, 1,6-hexamethylene diisocyanate (HDI), pentamethylene diisocyanate (PDI), isophorone diisocyanate (IPDI), 2,2,4- and 2,4,4-trimethyl-hexamethylene diisocyanate, the isomeric bis-(4, 4'-isocyanatocyclohexyl)methanes or mixtures thereof of any desired isomer content, benzene diisocyanate; 1,4-cyclohexylene diisocyanate, 1,12-dodecamethylene diisocyanate, 1,4-phenylene diisocyanate, 2,4- and/or 2,6-toluene diisocyanate (TDI) or hydrogenated 2,4- and/or 2,6-toluene diisocyanate, 1,5-naphthalene diisocyanate, 2,4'- and 4,4'-diphenylmethane diisocyanate (MDI), 1,3- and 1,4-bis-(2-isocyanato-prop-2-yl)-benzene (TMXDI), 1,3-bis(isocyanato-methyl)benzene (XDI), bis-(4-isocyanato-cyclohexyl) methane ($H_{12}$MDI), (S)-alkyl 2,6-diisocyanato-hexanoates or (L)-alkyl 2,6-diisocyanatohexanoates and mixtures thereof.

In one aspect of the invention, the composition is a two-component composition consisting of a first component and a second component, which are produced, packed and stored separately from one another, the at least one isocyanate not being present in the same component as the at least one aspartic ester.

In one aspect of the invention there is provided a cured conductive coating produced from a composition that includes a first component that includes at least one aspartic ester and conductive filler, and a second component includes at least one isocyanate. The conductive composition may further include an organic solvent and a catalyst.

In one aspect of the invention there is provided an electrically conductive, sandable, fairing compound produced from a conductive composition that includes a first component that includes at least one aspartic ester and conductive filler, and a second component includes at least one isocyanate. The conductive composition may further include an organic solvent and a catalyst.

In one aspect of the invention there is provided a method including the steps of applying a composition including at least one aspartic ester, a conductive filler, and at least one isocyanate to a substrate, wherein the composition is applied as an adhesive and/or a sealant or as a coating. A bonded and/or sealed or coated article obtained by this method includes an at least partly cured form of the composition.

DETAILED DESCRIPTION

The electrically conductive compositions of the present invention are two-component compositions. As used herein, the term "two-component composition" means a composition that includes at least two components that are stored/packaged separately because of their mutual reactivity. One component is a hardener/crosslinker component that includes at least one polyisocyanate. Another component is a binder component that includes at least one polyaspartic ester that is reactive with the polyisocyanate. The two components are typically not mixed until shortly before application of the composition to a substrate. It is advantageous that upon mixing, the pot life, i.e., "working time", is sufficient to allow application of the composition to the substrate prior to curing of the composition.

These conductive compositions are useful as gap fillers and conductive coatings in electrical housing and enclosure assemblies, such as for telecommunication, automotive engine control modules, radar systems, GPS and avionic control system applications. The electrically conductive compositions described herein are also useful in aircraft assembly for electrical continuity. For example, the electrically conductive compositions may be used as a gap filler between adjacent panels of an aircraft, as fairings, as fastener filling materials and as an electrically conductive coating.

These conductive compositions include an isocyanate component, a polyaspartic ester component that is reactive with the isocyanate component, a catalyst, electrically conductive filler, and optionally one or more additives. The composition of the present invention has a long pot life and produces cured conductive coatings, gap fillers and fairings that are flexible and fluid resistant.

Polyisocyanate Component:

As used herein, the term "polyisocyanate" refers to compounds comprising at least two free isocyanate groups. Polyisocyanates include diisocyanates and diisocyanate reaction products comprising, for example, biuret, isocyanurate, uretdione, urethane, urea, iminooxadiazine dione, oxadiazine trione, carbodiimide, acyl urea, and/or allophanate groups.

The polyisocyanate suitable for inclusion in the compositions of the present invention are in various embodiments, aromatic, araliphatic, aliphatic or cycloaliphatic di- and/or polyisocyanates and mixtures of such isocyanates. In one embodiment, the diisocyanates are of the formula:

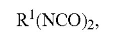

wherein $R^1$ represents an aliphatic hydrocarbon residue having 4 to 12 carbon atoms, a cycloaliphatic hydrocarbon residue having 6 to 15 carbon atoms, an aromatic hydrocarbon residue having 6 to 15 carbon atoms or an araliphatic hydrocarbon residue having 7 to 15 carbon atoms.

Specific examples of suitable isocyanates include, but are not limited to, ethylene diisocyanate; 1,4-tetramethylene diisocyanate, 1,6-hexamethylene diisocyanate (HDI), pentamethylene diisocyanate (PDI), isophorone diisocyanate (IPDI), 2,2,4- and 2,4,4-trimethyl-hexamethylene diisocyanate, the isomeric bis-(4,4'-isocyanatocyclohexyl) methanes or mixtures thereof of any desired isomer content, benzene diisocyanate; 1,4-cyclohexylene diisocyanate, 1,12-dodecamethylene diisocyanate, 1,4-phenylene diisocyanate, 2,4- and/or 2,6-toluene diisocyanate (TIDI) or hydrogenated 2,4- and/or 2,6-toluene diisocyanate, 1,5-naphthalene diisocyanate, 2,4'- and 4,4'-diphenylmethane diisocyanate (MDI), 1,3- and 1,4-bis-(2-isocyanato-prop-2-yl)-benzene (TMXDI), 1,3-bis(isocyanato-methyl)benzene (XDI), bis-(4-isocyanato-cyclohexyl)methane ($H_{12}$MDI), (S)-alkyl 2,6-diisocyanato-hexanoates or (L)-alkyl 2,6-diisocyanato-hexanoates. In various embodiments, the polyisocyanate component may comprise a triisocyanate, such as, for example, 4-isocyanatomethyl-1,8-octane diisocyanate (triisocyanatononane or TIN); isomers thereof; or derivatives thereof.

Polyisocyanates having isocyanurate, biuret, allophanate, uretdione or carbodiimide groups are also useful as the isocyanate component of the present invention. Such polyisocyanates may have isocyanate functionalities of three or more and are prepared by the trimerization or oligomerization of diisocyanates or by the reaction of diisocyanates with polyfunctional compounds containing hydroxyl or amine groups. Preferred is the isocyanurate of hexamethylene diisocyanate. Further suitable compounds are blocked polyisocyanates, such as 1,3,5-tris-[6-(1-methyl-propylidene aminoxy carbonylamino)hexyl]-2,4,6-trioxo-hexahydro-1,3,5-triazine.

Examples of suitable commercially available polyisocyanates include: aliphatic polyisocyanate based on hexamethylene diisocyanate (HDI) from Vencorex Chemicals under the trade names TOLONATE® HDT-LV and TOLONATE® HDT-LV2; from SAPICI under the trade names POLURENE® MT 100 LV and POLURENE® MT 100 LLV; and from Covestro AG under the trade names DESMODUR® N3200, DESMODUR® N3300, DESMODUR® N3600, DESMODUR® N3800, and DESMODUR® N3900.

In various embodiments of the curable conductive composition, the amount of isocyanate is 5-20% by weight, or 7-15% by weight, or 8-12% by weight, based on the weight of the curable conductive composition.

Polyaspartic Ester Component:

Various embodiments of the compositions of the present invention include a blend of two or more polyaspartic esters. Polyaspartic esters useful in the compositions of the present invention include compounds of formula (I):

(I)

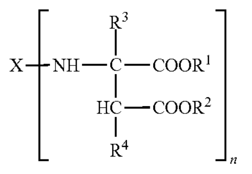

In compounds of formula (I), the residue X is preferably obtained from an n-valent polyamine selected from ethylenediamine, 1,2-diaminopropane, 1,4-diaminobutane, 1,6-diaminohexane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotoluylene-diamine, 2,4'- and/or 4,4'-diaminodicyclohexylmethane, 3,3'-dimethyl-4,4'-diaminodicyclohexylmethane, 2,4,4'-triamino-5-methyldicyclohexyl-methane, and polyether polyamines with aliphatically-bound primary amino groups and having a number average molecular weight, Mn, of 148 to 6000 g/mol where the number average molecular weight is determined according to ASTM D 3750-79, (1985).

The residue X, in one embodiment, is obtained from 1,4-diaminobutane, 1,6-diaminohexane, 2,2,4- and/or 2,4,4-trimethyl-1,6-diaminohexane, 1-amino-3,3,5-trimethyl-5-aminomethylcyclohexane, 4,4'-diaminodicyclohexylmethane or 3,3'-dimethyl-4,4'-diaminodicyclohexylmethane.

The phrase "inert to isocyanate groups under the reaction conditions," which is used to define groups $R^1$ and $R^2$, means that these groups do not have Zerevitinov-active hydrogens (CH-acid compounds; cf. Römpp Chemie Lexikon, Georg Thieme Verlag Stuttgart), such as OH, NH or SH.

$R^1$ and $R^2$, independently of one another, are in some embodiments $C_1$ to $C_{10}$ alkyl residues, in certain embodiments methyl or ethyl residues. Where X is the residue obtained from 2,4,4'-triamino-5-methyldicyclohexylmethane, $R^1$ and $R^2$ are preferably ethyl. $R^3$ and $R^4$ may be identical or different and represent hydrogen or organic groups which are inert towards isocyanate groups at a temperature of 100° C. or less, in some embodiments hydrogen or $C_1$ to $C_{10}$ alkyl residues, in certain embodiments hydrogen, methyl or ethyl residues. In some embodiments, $R^3$ and $R^4$ are both hydrogen. In formula I), n is in some embodiments an integer from 2 to 6, in other embodiments 2 to 4.

The production of polyaspartic esters takes place in known manner by reacting the corresponding primary polyamines of the formula (II):

(II)

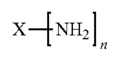

with maleic or fumaric acid esters of the formula (III):

(III)

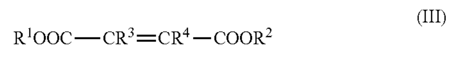

where $R^1$, $R^2$, $R^3$ and $R^4$ are as defined above for formula (I). Examples of suitable maleic or fumaric acid esters are dimethyl maleate, diethyl maleate, dibutyl maleate, and the corresponding fumarates.

In various embodiments, the production of polyaspartic esters from the above-mentioned starting materials takes place within the temperature range of 0° C. to 100° C. The starting materials are used in amounts such that there is at least one, preferably one, olefinic double bond for each primary amino group. Any starting materials used in excess can be separated off by distillation following the reaction. The reaction can take place in the presence or absence of suitable solvents, such as methanol, ethanol, propanol, dioxane, or mixtures thereof.

Examples of suitable aspartic ester functional amines are those commercially available from Arnette Polymers under the trade names ALI® 138 and ALI® 146; from Covestro LLC under the trade names DESMOPHEN® NH 1420 and DESMOPHEN® NH 1520; and from Cargill under the trade names ALTOR® 201 and ALTOR® 205.

In various embodiments of the curable conductive composition, the amount of aspartic ester is 5-30% by weight, or 7-25% by weight, or 8-20% by weight, based on the weight of the curable conductive composition.

Conductive Fillers:

Conductive fillers that are suitable for the conductive composition include, for example, nickel, cobalt, silver, gold, silver plated aluminum, nickel plated aluminum, silver plated copper, tungsten clad graphite, nickel clad graphite, and graphite.

In various embodiments of the curable conductive composition, the amount of conductive fillers is greater than 50% by weight, or 50-80% by weight, or 50-75% by weight, based on the weight of the curable conductive composition.

Catalyst:

The conductive composition may include a catalyst. The catalyst, if present, is generally included in the binder, i.e., aspartic acid containing, component. Examples of suitable catalysts include deionized water, carboxylic acids, and 1,4-butanediol.

In various embodiments of the curable conductive composition, the amount of catalyst is 0-3% by weight, or 0.05-1.0% by weight, or 0.1-0.5% by weight, based on the weight of the curable conductive composition.

Solvent:

The two-component compositions disclosed herein may include one or more organic solvents. The presence of solvent is useful for achieving acceptable working life, as well as the evaporation of solvent to induce shrinkage of the conductive composition, which improves conductivity. Suitable solvents that may be used in the compositions of the present invention include esters, ketones, aromatic hydrocarbons such as ethyl acetate, butyl acetate, methoxypropylacetate, acetone, methyl ethyl ketone, methyl isobutyl ketone, cyclohexanone, toluene, xylene, solvent naphtha 100, parachlorobenzotrifluoride (PCBTF) and mixtures thereof.

The amount of solvent used may depend on the method by which the curable composition is applied, and the curing conditions used. For example, more solvent will be used if it a sprayable conductive coating is desirable. For applications where the curable conductive composition is to be used as a fairing, the amount of solvent used will allow sufficient working life and allow the fairing material to be sanded after 6 to 8 hours after application.

In various embodiments of the curable conductive composition, the amount of solvent is 0.01-50% by weight, or 0.01-10% by weight, or 0.01-0.5% by weight, based on the weight of the curable conductive composition.

Manufacturing Process:

The aspartic ester(s), conductive filler, and optionally solvent and catalyst are combined in a suitable mixer. The resulting paste is the Part A of a two-part kit.

The isocyanate(s) and solvent(s) are combined and mixed until the isocyanates have dissociated into the solvent homogeneously. This is the Part B of the two-part kit.

The Part A and the Part B are then packaged into suitable containers that protect against the degradation of the materials, for instance due to moisture ingress.

EXAMPLES

In the following exemplary compositions, the materials used in preparing the compositions are:

- Aspartic Ester A: a 100% solids content aspartic ester functional amine, having an amine number of approx. 201 mg KOH/g, viscosity of 1450 mPa·s, commercially available from Covestro LLC as DESMOPHEN NH 1420.
- Aspartic Ester B: a 90% solids (by volume) content, zero VOC, aspartic ester functional amine, commercially available from Duraamen Engineered Products, Inc. as PERDURE P90, Part A.
- Isocyanate A: an aliphatic polyisocyanate resin based on hexamethylene diisocyanate, NCO content 23.0±1.0%, viscosity of 600±150 mPa·s, commercially available from Vencorex Chemicals as TOLONATE HDT-LV2.
- Isocyanate B: a 90% solids (by volume) content, zero VOC aliphatic polyisocyanate resin, commercially available from Duraamen Engineered Products, Inc. as PERDURE P90, Part B. The viscosity of Aspartic Ester B mixed 1:1 with Isocyanate B is 250-300 mPa·s.

Solvent A: Acetone.

- Electrically Conductive Filler A: Nickel-clad, ca. 60% nickel content, irregular-shaped graphite powder, 40-120 microns in size, commercially available from Weber Manufacturing, Midland, Ontario, Canada.
- Electrically Conductive Filler B: A silver-clad aluminum powder, 30-60 micron in size, ca. 12% silver content, produced by Parker Hannifin Corporation, Chomerics Division, Woburn, Massachusetts.

Example 1

A two-component conductive composition was prepared as follows: Component 1A: This component was prepared containing a blend of an aspartic ester, catalyst (deionized water) and electrically conductive filler. Component 1B contained a blend of Isocyanate A and Solvent A.

TABLE 1

| Example 1 | | Amount (wt basis) |
|---|---|---|
| Component 1A | Aspartic Ester A | 144.9 |
| | Catalyst (deionized water) | 1.6 |
| | Electrically Conductive Filler A | 724.7 |
| Component 2A | Isocyanate A | 96.6 |
| | Solvent A | 32.2 |
| Total | | 1000 |

The resistivity of the mixed and cured conductive composition was measured over time, as shown in Table 2.

TABLE 2

| | 24-hour resistivity (Ω/sq) | 96-hour resistivity (Ω/sq) | 168-hour resistivity (Ω/sq) |
|---|---|---|---|
| Example 1 | 0.187 | 0.101 | 0.063 |

Example 2

A two-component conductive composition was prepared as follows: Component 2A: This component was prepared containing a blend of a solvated aspartic ester, catalyst (deionized water) and electrically conductive filler. Component 2B was composed solely of a solvated isocyanate, Isocyanate B.

TABLE 3

| Example 2 | | Amount (wt basis) |
|---|---|---|
| Component 1B | Aspartic Ester B | 142.7 |
| | Catalyst (deionized water) | 1.4 |
| | Electrically Conductive Filler B | 713.2 |
| Component 2B | Isocyanate B | 142.7 |
| Total | | 1000 |

The resistivity of the mixed and cured conductive composition was measured over time, as shown in Table 4.

TABLE 4

| | 24-hour resistivity (Ω/sq) | 96-hour resistivity (Ω/sq) | 168-hour resistivity (Ω/sq) |
|---|---|---|---|
| Example 1 | 0.700 | 0.547 | 0.336 |

The conductive compositions of the present invention, upon mixing of the two components, have a working life of at least 20 minutes. Upon curing of the conductive compositions, the conductive compositions have a through resistance of less than 10, a surface resistivity of less than 1 Ω/sq, and a hardness of at least 60 Shore A.

The conductive compositions described herein were evaluated for chemical resistance and found to have a volume swell of less than 5%, and in some embodiments less than 1%, when exposed to the following fluids for three (3) days at room temperature: JP-8 jet fuel (MIL-DTL-83133), hydraulic fluid (MIL-PRF-83282), and de-icing fluid (AMS-1424). The equation used for determining volume swell is as follows:

$$\text{Volume Swell } \% = \frac{(m_{af} - m_{wf}) - (m_{ai} - m_{wi})}{(m_{ai} - m_{wi})} \times 100$$

wherein, "a" is air, "w" is water, "i" is initial and "f" is final. The method for measuring these masses is described in ASTM D792.

Although the invention has been shown and described with respect to a certain preferred embodiment or embodiments, it is obvious that equivalent alterations and modifications will occur to others skilled in the art upon the reading and understanding of this specification. While a particular feature of the invention may have been described above with respect to only one or more of several illustrated embodiments, such feature may be combined with one or more other features of the other embodiments, as may be desired and advantageous for any given or particular application.

The invention claimed is:

1. A conductive composition comprising:
at least one aspartic ester, wherein an amount of the at least one aspartic ester is 5-30% by weight based on the weight of the conductive composition;
at least one isocyanate, wherein an amount of the at least one isocyanate ester is 5-20% by weight based on the weight of the conductive composition; and
conductive filler, wherein an amount of the conductive filler is greater than 50% by weight based on the weight of the conductive composition; and
an organic solvent, wherein an amount of the solvent is 0.01-10% by weight based on the weight of the conductive composition.

2. The conductive composition of claim 1, further comprising a catalyst.

3. The conductive composition of claim 1, wherein the conductive filler is selected from nickel, cobalt, silver, gold, silver plated aluminum, nickel plated aluminum, silver plated copper, tungsten clad graphite, nickel clad graphite, and graphite.

4. The conductive composition of claim 1, wherein the at least one aspartic ester has the formula (I):

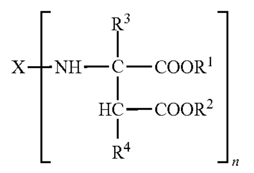

(I)

wherein X represents an aliphatic residue;
$R^1$ and $R^2$ independently represent $C_1$ to $C_{10}$ alkyl residues; and
$R^3$ and $R^4$ independently represent hydrogen or an organic group that is inert towards isocyanate at temperatures of 100° C. or less.

5. The conductive composition of claim 4, wherein the at least one aspartic ester comprises a blend of at least two aspartic esters having the formula (I).

6. The conductive composition of claim 1, wherein the at least one isocyanate is selected from ethylene diisocyanate; 1,4-tetramethylene diisocyanate, 1,6-hexamethylene diisocyanate (HDI), pentamethylene diisocyanate (PDI), isophorone diisocyanate (IPDI), 2,2,4- and 2,4,4-trimethylhexamethylene diisocyanate, the isomeric bis-(4,4'-isocyanatocyclohexyl) methanes or mixtures thereof of any desired isomer content, benzene diisocyanate; 1,4-cyclohexylene diisocyanate, 1,12-dodecamethylene diisocyanate, 1,4-phenylene diisocyanate, 2,4- and/or 2,6-toluene diisocyanate (TDI) or hydrogenated 2,4- and/or 2,6-toluene diisocyanate, 1,5-naphthalene diisocyanate, 2,4'- and 4,4'-diphenylmethane diisocyanate (MDI), 1,3- and 1,4-bis-(2-isocyanato-prop-2-yl)-benzene (TMXDI), 1,3-bis (isocyanato-methyl)benzene (XDI), bis-(4-isocyanatocyclohexyl)methane ($H_{12}$MDI), (S)-alkyl 2,6-diisocyanatohexanoates or (L)-alkyl 2,6-diisocyanatohexanoates and mixtures thereof.

7. The conductive composition of claim 1, wherein it is a two-component composition consisting of a first component and a second component, which are produced, packed and stored separately from one another, the at least one isocyanate not being present in the same component as the at least one aspartic ester.

8. A cured conductive coating produced from the composition of claim 1.

9. An electrically conductive, sandable, fairing compound produced from the composition of claim 1.

10. A method comprising applying the composition of claim 1 to a substrate, wherein the composition is applied as adhesive and/or sealant or as coating.

11. A bonded and/or sealed or coated article obtained from the method of claim 10, the article comprising an at least partly cured form of the composition.

* * * * *